Nov. 27, 1962     R. E. McAFEE ET AL     3,065,822
LUBRICATING MEANS FOR A POWER TRANSMISSION
Filed Dec. 12, 1960
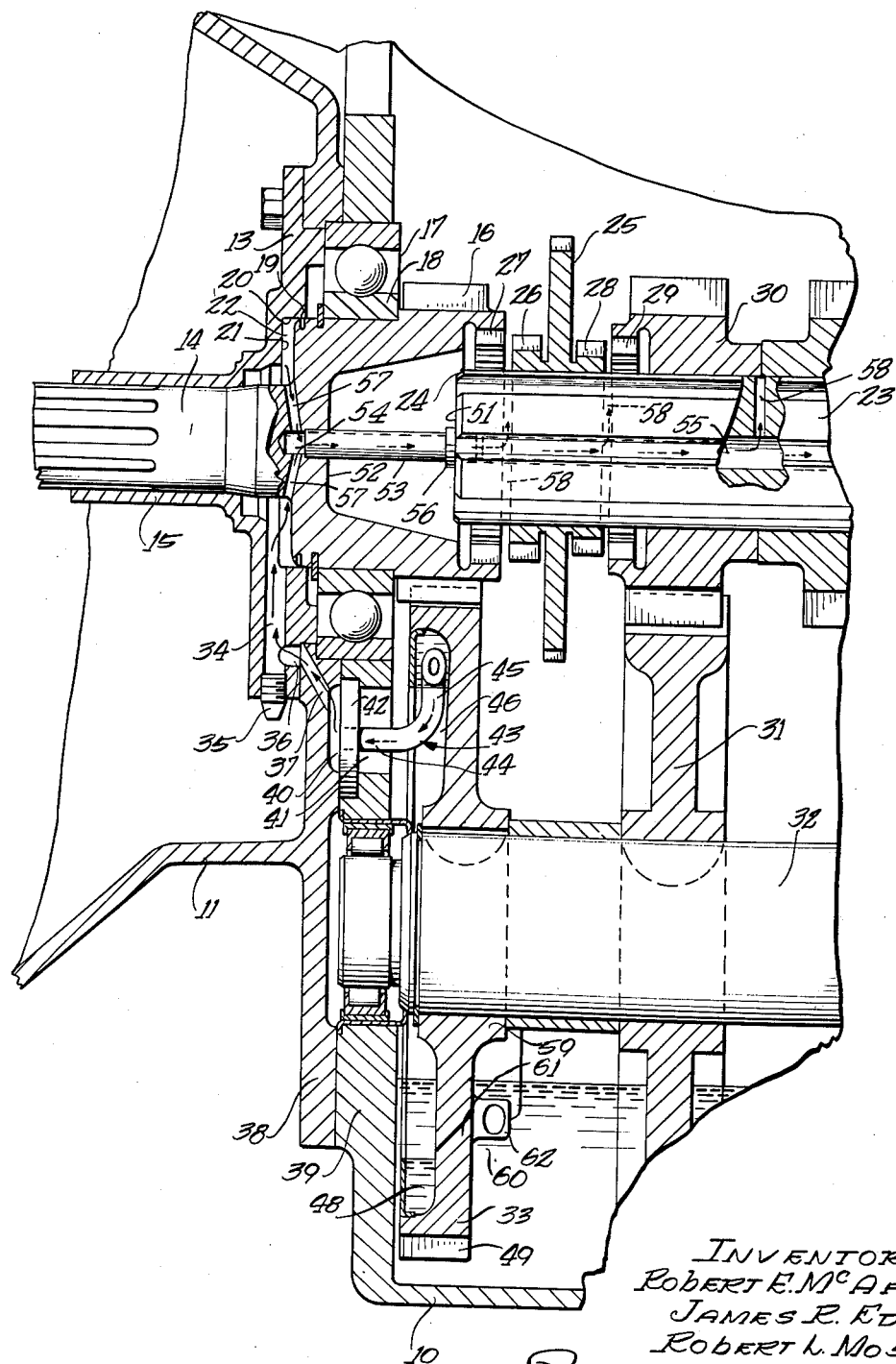
INVENTORS
ROBERT E. McAFEE
JAMES R. EDDY
ROBERT L. MOSER
Paul O. Pippel
ATTORNEY

United States Patent Office 3,065,822
Patented Nov. 27, 1962

3,065,822
LUBRICATING MEANS FOR A POWER TRANSMISSION
Robert E. McAfee, Fort Wayne, James R. Eddy, North Webster, and Robert L. Moser, Columbia City, Ind., assignors to International Harvester Company, Chicago, Ill., a corporation of New Jersey
Filed Dec. 12, 1960, Ser. No. 75,151
15 Claims. (Cl. 184—6)

This invention relates to lubricating means for a power transmission and more particularly to lubricating means for supplying the bearings and other relatively movable machine parts of a power transmission with lubricant under pressure.

It is an important object of the present invention to provide a lubricating system for a power transmission which will supply a copious amount of lubricant under pressure to various moving parts of the transmission continuously during operation thereof without the necessity of an expensive gear-type lubricating pump for producing the fluid pressure head for circulating the lubricant.

The lubrication of transmission gears and bearing members in power transmissions particularly used in motor vehicles is partially provided for by having certain of the gears rotated within the lubricant contained in the lubricant sump located in the bottom of the transmission housing. While the splash feed distribution of lubricant is helpful to supply sufficient lubricant to the various gears and bearings of the transmission, a positive type pump is generally used in addition to provide a forced lubrication system in conjunction with the conventional splash feed lubrication system. In general the positive type pump employed in automotive power transmissions is in the form of a rotary gear type pump mounted within the transmission housing and is adapted to be driven by one of the transmission shafts. While numerous attempts have been made to make such pumps of the required capacity compact, difficulty has been experienced to locate the pumps within the transmission housing where space is at a premium. Furthermore, rotary gear type pumps add considerably to the overall cost of manufacturing the power transmission.

It is therefore another important object of the present invention to provide an inexpensive pitot-type tube pump for circulating lubricant through a power transmission under pressure and which requires a minimum of space within the transmission housing. The invention contemplates the provision of a lubricant receiving chamber arranged on one of the power transmission gears and means for supplying the chamber with lubricant whenever the gear is rotated and to a position the intake nozzle of a pitot tube within the lubricant contained within the lubricant receiving chamber. The lubricant is then forced under pressure from the pitot tube to a distribution chamber which is in fluid communication with various passageways leading to the bearings and other relatively moving parts of the transmission requiring lubrication.

The foregoing and other important projects and desirable features inherent in and encompassed by the invention together with many of the purposes and uses thereof will become readily apparent from a reading of the ensuing description in connection with the annexed drawing in which:

The drawing shows a fragmentary vertical sectional view taken longitudinally of a power transmission incorporating the invention.

Referring to the drawing in detail where like reference characters represent like elements throughout the view, the forwardmost portion of a transmission housing 10 is shown. A clutch bell housing 11 is fastened to one end of the transmission housing 10 by bolts or the like, not shown, and closes one end of the transmission housing 10. The clutch housing 11 is provided with a generally circular opening over which is secured the radially extending flangelike portion 12 of a bearing retainer 13. A stub shaft 14 driven by the vehicle engine, not shown, extends through the tubular section 15 of the bearing retainer 13. The main drive gear 16 of the power transmission is integrally formed with a cup-shaped end portion of the stub shaft 14. The main drive gear 16 is rotatably supported within the transmission housing 10 by an anti-friction bearing unit 17, the inner race 18 of which is secured to the stub shaft 14 adjacent to the main drive gear 16. The stub shaft 14 also carries an annular oil sealing means 19 which engages an axially extending cylindrical surface 20 formed in the flange-like portion 12 of the bearing retainer 13. It will be noted that the section of the shaft 14 extending through the tubular section 15 is of less diameter than the cup-shaped portion of the stub shaft having the main drive gear 16 formed thereon and the annular radially extending surface 21 defining the juncture of the shaft section and cup-shaped portion is axially spaced from the flangelike portion 12 of the bearing retainer 13 to partially define an annular lubricant distribution chamber 22, the purpose of which will be explained hereinafter.

The end section of the main transmission drive shaft 23 is shown in the drawing and is provided with splining 24. A gear speed synchronizer 25 shown somewhat diagrammatically is non-rotatably mounted on the main drive shaft 23 by means of the splining 24. The main drive shaft 23 is in axial alignment with the stub shaft 14 and by sliding the synchronizer 25 to the left as viewed in the drawing relatively to the main shaft 23 effects meshing engagement of one set of synchronizer dental teeth 26 with cooperating dental teeth 27 formed on the enlarged portion of the stub shaft 14 to effect a driving connection between the stub shaft 14 and the main drive shaft 23. Similarly by sliding the synchronizer 25 to the right effects a driving engagement between the other set of synchronizer dental teeth 28 with dental teeth 29 integrally formed on one axial side of a gear 30 rotatably supported upon the main drive shaft 23. The gear 30 in turn is in meshing engagement with a gear 31 keyed to a countershaft 32 extending parallel to and vertically spaced below the main drive shaft 23. The countershaft 32 also carries a gear 33 which is non-rotatably secured thereto and is in continuous meshing engagement with the main drive gear 16. From the foregoing it will be appreciated that whenever the power transmission is in operation and the main drive gear 16 is driven by a source of motive power such as an engine or the like, the gear 33 is rotating.

The flange-like portion 12 of the bearing retainer 13 is provided with an elongated radially extending passageway 34 therethrough. The radially innermost end of the passageway 34 opens into the lubricant distribution chamber 22 and the opposite end thereof is provided with internal screw threads. A removable plug 35 is adapted to be threaded into the end of the passageway 34 to close the same, and is made of magnetic material such that any foreign metallic particles such as machining chips, etc., that are contained in the lubricant flowing through the passageway 34 are deposited on the end of the plug 35 exposed to the flowing lubricant and thus separate from the lubricant. In this manner the metallic particles contained within the lubricant are prevented from reaching the bearings and other relatively moving parts of the power transmission where they would be harmful to the bearing surfaces. The flange-like portion 12 is also provided with a relatively short axially extending passageway 36 which extends from the passageway 34 adjacent the magnetic plug 35 and is in fluid communication with one end of a radially and axially inclined passageway 37 formed through the end wall 38 of the clutch bell housing 11 attached to the end wall 39 of the transmission casing 10. The radially outermost end of the inclined passageway 37 opens into a cavity 40 provided on the inwardly facing surface of the end wall 38 of the clutch bell housing 11.

The end wall 39 of the transmission housing 10 is provided with an axially extending opening 41 therethrough in axial alignment with the cavity 40. Press fit into the end wall 39 at the end of the opening 41 opening into the cavity 40 is a circular mounting plate 42 which is adapted to support a pitot tube 43. The pitot tube 43 is substantially L-shaped with the end of one leg 44 extending axially through the mounting plate 42 and the other leg 45 extending radially inwardly. It will be noted that the radially extending leg 45 is disposed within an annular recess 46 formed on one side of the gear 33. A metal ring 47 is press fit or otherwise suitably secured to the gear 33 within the recess 46 and serves as an axial side wall for a lubricant receiving chamber 48. The lubricant receiving chamber 48 which has its radially innermost end open is disposed adjacent the teeth 49 of the gear 33 and consequently, any fluid received in the chamber 48 through the annular opening will tend to flow to the bottom or radially outermost surface of the gear 33 defining the bottom of the chamber 48 whenever the gear 33 is rotating because of centrifugal force acting upon the lubricant received in the chamber 48. The leg 45 of the pitot tube 43 extends into the lubricant receiving chamber 48 and the free end thereof is provided with a tip portion 50, the outer opening of which faces in a direction opposite to the direction of rotation of the gear 33 at that point. Thus, lubricant contained within the chamber 48 is flung outwardly and accumulates at the outer periphery or bottom of the chamber where the tip portion 50 of the Pitot tube 43 opens into the chamber when the gear 33 is rotated. Inasmuch as the Pitot tube is stationary, the lubricant will be rammed into the Pitot tube 43 where it flows radially inwardly through the leg 45 and then axially through the leg 44 and empties into the pocket defined by the wall of the cavity 40 and the Pitot tube mounting plate 42. Inasmuch as the lubricant received in the pocket is under pressure when the gear 33 is rotating, the lubricant flows through the inclined passageway 37 and short passageway 36 over the magnetic plug 35 where any foreign metallic particles contained in the flowing oil are deposited on the end face of the magnetic plug exposed to the lubricant. The lubricant then flows radially inwardly through the passageway 34 into the annular chamber 22 encircling the stub shaft 14. The annular oil sealing means 19 prevents lubricant from leaking between the cylindrical surface 20 formed in the flange-like portion 12 of the bearing retainer 13 and the enlarged cup-shaped end portion of the stub shaft 14. The end surface 51 of the main transmission drive shaft 23 facing the interior of the stub shaft cup-shaped end portion is axially spaced from the surface 52 defining the bottom of the cup-shaped end portion. Extending between the surfaces 51 and 52 is an elongated lubricant conducting tube 53 which has one end rigidly secured within a recess 54 formed in the cup-shaped end portion of the stub shaft 14 and its opposite end extending into one end of an axially extending lubricant duct 55 formed through the main transmission drive shaft 23. Suitable rotary sealing means 56 are provided between the end of the tube 53 projecting into the lubricant duct 55 and the end surface of the drive shaft 23 defining one end of the lubricant duct 55. A plurality of generally radially extending passageways 57 are formed in the stub shaft 14 and are adapted to place the annular chamber 22 in fluid communication with the recess 54. Thus, lubricant under pressure can flow from the annular chamber 22 to the axially extending lubricant duct 55 by way of the passageways 57, recess 54 and lubricant conducting tube 53. Communicating with the axially extending lubricant duct 55 are a plurality of radially extending lubricant passages 58 which extend to various shaft bearings and other points along the shaft where lubricant is required.

The bottom of the transmission housing 10 is formed to provide an oil sump for containing a quantity of lubricant. As is shown in the drawing the normal operating level of the lubricant collected in the oil sump is intermediate the lowermost tooth 49 and the hub 59 of the gear 33 when the gear is at rest. Thus the lubricant-receiving chamber 48 is partially filled with lubricant when the gear 33 is at rest since a portion of the annular opening is disposed below the level of the lubricant contained within the sump. The face of the gear 33 opposite the annular recess 46 is provided with a plurality (only one of which is shown in the drawing) of axially extending scoops 60 radially spaced between the teeth 49 and the hub 59. A passageway 61 extends through each scoop 60 and the gear 33, one end of the passageway 61 opens into the lubricant-receiving chamber 48 adjacent the annular opening thereof and the opposite end extends to a relatively flat face 62 of a respective scoop 60. It will be manifest that the flat faces 62 are oriented such that when the gear 33 is rotated in a particular direction, the flat faces 62 are caused to dip into the lubricant contained within the sump with the flat faces 62 define the leading surfaces of the scoop 60. The consequent lubricant is caused to flow from the sump to the lubricant-receiving chamber 48.

From the foregoing it is believed the operation of the lubricating means for the power transmission is clear. Whenever the transmission is transmitting power the stub shaft 14 is rotating and since the gear 33 is in constant mesh with the stub shaft 14, the gear 33 also rotates continuously when power is being transmitted through the power transmission. Thus the scoops 60 maintain the lubricant-receiving chamber 48 supplied with lubricant and the lubricant received within the chamber 48 tends to flow to the bottom or radially outermost surface of the chamber because of centrifugal force acting upon the lubricant. Inasmuch as the lubricant in the chamber 48 is rotating with the gear 33 and the tip portion 50 disposed within the lubricant is stationary, the lubricant will be rammed into the Pitot tube 43 and eventually empties into the passageway 34 under pressure after first passing over the magnetic plug 35 where any foreign metallic elements are prevented from being carried to the transmission bearing and other parts to be lubricated. Lubricant under pressure then flows axially through the conducting tube 53 to the transmission main shaft lubricating duct 55. From the lubricating duct 55 the lubricant flows radially to the various bearings and other parts requiring lubrication under pressure. After flowing through the bearings and other machine parts the lubricant is allowed to drain by gravity to the sump. Thus a novel lubricating system for a power transmission has been provided which will continuously provide a copious amount of lubricant under pressure to the various moving parts of the transmission whenever the transmission is in operation without the necessity of having an expensive conventional gear-type lubricating pump to accomplish the same objective.

The embodiment of the invention chosen for the purposes of illustration and description herein is that preferred as a result of selective test based upon the requirements for achieving the objects of the invention and developing the utility thereof in a most desirable manner due regard being had to existing practice of economy, simplicity of design and construction and the improvement sought to be effected. It will be appreciated therefore that the particular structural and functional aspects emphasized herein are not intended to exclude, but rather to suggest such other adaptations and modifications of the invention as fall within the spirit and scope of the invention as defined in the appended claims.

What is claimed is:

1. In a power transmission having a housing provided with a sump in the lower portion thereof adapted to contain lubricant at a certain normal operating level and a plurality of relatively movable machine parts above the normal operating level of the lubricant requiring lubrication; means for supplying said relatively movable machine parts with lubricant under pressure whenever the power transmission is in operation including a chamber rotatable whenever the power transmission is in operation, a substantially L-shaped tube fixed to said housing, the end of one leg of said tube being provided with a tip portion disposed in said chamber, said tip portion having an opening facing into the direction of rotation of said chamber and being vertically spaced between the normal level of lubricant in the sump and the plurality of relatively movable machine parts requiring lubrication, means rotatable with said chamber for supplying said chamber with lubricant whenever the power transmission is in operation and passageway means extending between said tube and said plurality of relatively movable machine parts.

2. In a power transmission having a housing provided with a sump in the lower portion thereof adapted to contain lubricant at a certain normal operating level and a plurality of relatively movable machine parts above the normal operating level of the lubricant requiring lubrication; means for supplying said relatively movable machine parts with lubricant under pressure whenever the power transmission is in operation including a chamber rotatable about a substantially horizontal axis vertically spaced above the normal operating level of lubricant in the sump whenever the power transmission is in operation, means rotatable with said chamber for supplying said chamber with lubricant when the transmission is in operation, a tube movable relatively to said chamber when the power transmission is in operation, one end of said tube being provided with an opening disposed in said chamber, said opening facing into the direction of rotation of said chamber, and passageway means extending between the end of said tube opposite the end opening into said chamber and said plurality of relatively movable machine parts.

3. In a power transmission having a housing provided with a sump in the lower portion thereof adapted to contain lubricant at a certain normal operating level and a plurality of relatively movable machine parts above the normal operating level of the lubricant requiring lubrication; means for supplying said relatively movable machine parts with lubricant under pressure whenever the power transmission is in operation including an annular lubricant-receiving chamber having a substantially U-shaped cross-section supported in said housing for rotation about a substantially horizontal axis vertically spaced above the normal operating level of lubricant in the sump whenever the power transmission is in operation, said lubricant-receiving chamber having a lower portion thereof extending below the normal operating level of the lubricant in said sump, means rotatable with said chamber for supplying said chamber with lubricant whenever the power transmission is in operation a tube movable relatively to said lubricant-receiving chamber when the power transmission is in operation, one end of said tube being provided with an opening disposed in said lubricant-receiving chamber, said opening facing into the direction of rotation of said lubricant-receiving chamber and being vertically spaced above the normal operating level of lubricant in the sump and vertically below the plurality of relatively movable machine parts requiring lubrication, and passageway means extending between the end of said tube opposite the end opening into said lubricant-receiving chamber and said plurality of relatively movable machine parts.

4. In a power transmission having a housing provided with a sump in the lower portion thereof adapted to contain lubricant at a certain normal operating level and a plurality of relatively movable machine parts above the normal operating level of the lubricant requiring lubrication; a lubricant distribution chamber above the normal operating level of the lubricant in said sump, said chamber being in fluid communication with said relatively movable machine parts; means for supplying said lubricant distribution chamber with lubricant under pressure whenever the power transmission is in operation including a gear rotatably supported in said housing with the lower portion thereof extending below the normal operating level of the lubricant in said sump, said gear being adapted to rotate whenever the power transmission is in operation, a lubricant-receiving chamber carried by said gear and rotatable therewith, means carried by said gear for supplying said lubricant-receiving chamber with lubricant when the transmission is in operation, a tube movable relatively to said gear when the power transmission is in operation, one end of said tube being provided with an opening disposed in said lubricant-receiving chamber, said opening facing into the direction of rotation of said gear, and passageway means extending between the end of said tube opposite the end opening into said lubricant-receiving chamber and said lubricant distribution chamber.

5. In a power transmission as set forth in claim 4, further including a magnetic plug detachably secured to said housing, said plug having a surface thereof exposed to the lubricant flowing through said passageway means when secured to said housing.

6. In a power transmission having a housing provided with a sump in the lower portion thereof adapted to contain lubricant at a certain normal operating level and a plurality of relatively movable machine parts above the normal operating level of the lubricant requiring lubrication; a gear rotatably supported in said housing with the lower portion thereof extending below the normal operating level of the lubricant in said sump, said gear being adapted to rotate whenever the power transmission is in operation; an annular lubricant-receiving chamber carried on one side of and rotatable with said gear; means carried by said gear for supplying said lubricant-receiving chamber with lubricant when the transmission is in operation; a stationary pitot-tube provided with a tip portion disposed in said lubricant-receiving chamber, said tip portion having an opening facing into the direction of rotation of said gear; and passageway means extending between the end of said pitot-tube opposite said tip portion and said relatively movable machine parts requiring lubrication.

7. In a power transmission as set forth in claim 6, wherein a section of said passageway means extends radially through a vertical wall means defining an end wall of said housing and said vertical wall means is provided with a recess for establishing fluid communication between said section and the exterior of said housing, and a plug of magnetic material detachably secured in said recess to close the same, a surface of said plug being exposed to the lubricant flowing in said passageway means when said plug is secured to said vertical wall means.

8. In a power transmission having a housing provided with a sump in the lower portion thereof adapted to contain lubricant at a certain normal operating level; a lubricant distribution chamber above the normal operating level of lubricant, said chamber being in fluid communication with relatively movable machine parts of the transmission requiring lubrication; a gear rotatably supported in said housing with the lower portion thereof extending below the normal operating level of the lubricant in said sump; an annular lubricant-receiving chamber carried on one side of and rotatable with said gear; means carried by said gear for supplying said lubricant-receiving chamber with lubricant when the power transmission is in operation; a stationary Pitot tube having one end provided with a tip portion disposed in said lubricant-receiving chamber, said tip portion having an opening facing into the direction of rotation of said gear; and a generally radially extending passageway means extending between the end of said Pitot tube opposite said tip portion and said lubricant distribution chamber.

9. In a power transmission having a housing provided with a sump in the lower portion thereof adapted to contain lubricant at a certain normal operating level and a plurality of relatively movable machine parts above the normal operating level of the lubricant requiring lubrication; an annular lubricant distribution chamber above the normal operating level of the lubricant in said sump, said chamber being in fluid communication with said relatively movable machine parts; a gear rotatably supported in said housing with the lower portion thereof extending below the normal operating level of the lubricant in said sump, said gear being adapted to rotate whenever the power transmission is in operation; an annular lubricant-receiving chamber carried on one side of and rotatable with said gear; means for supplying said lubricant-receiving chamber with lubricant when the transmission is in operation including a plurality of circumferentially spaced scoops projecting axially from the side of said gear opposite said lubricant-receiving chamber, each of said scoops having an inlet opening facing into the direction of rotation of said gear, and a plurality of lubricant inlet passages extending through said gear, each of said inlet passages being in communication with said lubricant-receiving chamber and a respective scoop inlet opening; a stationary Pitot-tube provided with a tip portoin disposed in said lubricant-receiving chamber, said tip portion having an opening facing into the direction of rotation of said gear; and generally radially extending passageway means extending between the end of said Pitot-tube opposite said tip portion and said lubricant distribution chamber.

10. In a power transmission having a housing provided with a sump in the lower portion thereof adapted to contain lubricant at a certain normal operating level and a plurality of relatively movable machine parts above the normal level of the lubricant requiring lubrication; an annular lubricant distribution chamber disposed above the normal operating level of the lubricant in said sump, said chamber being adjacent one end of said housing; passageway means extending between said distribution chamber and said plurality of relatively movable machine parts; a gear rotatably supported in said housing with the lower portion thereof extending below the normal operating level of the lubricant in said sump, said gear being adapted to rotate whenever the power transmission is in operation; an annular lubricant-receiving chamber carried on one side of and rotatable with said gear, said chamber having a substantially U-shape in radial cross section; means for supplying said lubricant-receiving chamber with lubricant when the transmission is in operation including a plurality of circumferentially spaced scoops projecting axially from the side of said gear opposite said lubricant-receiving chamber, each of said scoops having an inlet opening facing into the direction of rotation of said gear, and a plurality of lubricant inlet passages extending axially and radially outwardly through said gear, each of said inlet passages being in communication with said lubricant-receiving chamber and a respective scoop inlet opening; a substantially L-shaped Pitot-tube fixed to said housing, one end of one of the legs of said L-shaped Pitot-tube being provided with a tip portion substantially perpendicular to said one leg, said tip portion being disposed in said lubricant-receiving chamber and having an opening facing into the direction of rotation of said gear; and generally radially extending passageway means extending between said Pitot-tube and said lubricant distribution chamber.

11. In a power transmission having a housing provided with a sump in the lower portion thereof adapted to contain lubricant at a certain normal operating level, said sump being partially defined by vertical end wall means; a drive shaft extending through an end wall of said housing having a gear fixed on one end thereof disposed within said housing above the normal operating level of the lubricant; a transmission shaft rotatably supported within said housing in axial alignment with said drive shaft and having an axially extending lubricant conveying duct therethrough, one end of said transmission shaft being axially spaced from said transmission housing end wall means; an anti-friction bearing unit between said end wall means and said drive shaft for rotatably supporting said drive shaft, said end wall means including a bearing retainer for said anti-friction bearing unit including a tubular portion encircling said drive shaft and a radially extending plate-like portion; an annular lubricant distribution chamber encircling said drive shaft and partially defined by said bearing retainer plate-like portion; a plurality of machine parts having bearing surfaces mounted on said transmission shaft for relative movement therebetween; a second gear rotatably supported in said housing in meshing engagement with said first mentioned gear fixed to said drive shaft, said second gear having its lower portion extending below the normal operating level of the lubricant in said sump; an annular lubricant-receiving chamber carried on one side of and rotatable with said gear; means for supplying said lubricant-receiving chamber with lubricant when the transmission is in operation including a plurality of circumferentially spaced scoops projecting axially from the side of said second gear opposite said lubricant-receiving chamber, each of said scoops having an inlet opening facing into the direction of rotation of said gear, and a plurality of lubricant inlet passages extending through said gear, each of said inlet passages being in communication with said lubricant-receiving chamber and a respective scoop inlet opening; a substantially L-shaped Pitot-tube having the end of one leg thereof secured to said transmission housing end wall means, the free end of the other leg of said Pitot-tube being provided with a tip portion extending substantially perpendicular to said other leg and disposed in said lubricant-receiving chamber, said tip portion having an opening facing in the direction of rotation of said second gear; lubricant conducting means extending between the end of said Pitot-tube opposite said tip portion and said lubricant distribution chamber including a generally radially extending duct formed through said plate-like portion of said bearing retainer; and axially extending passageway means extending between said lubricant distribution chamber and one end of said axially extending duct extending through said transmission shaft.

12. In a power transmission substantially as set forth in claim 11, wherein said generally radially extending duct formed through said plate-like portion of said bearing retainer has one end opening exteriorly of said transmission housing; and a removable plug of magnetic material adapted to be detachably secured to said plate-like portion to close said duct opening.

13. In a power transmission having a housing provided with a sump in the lower portion thereof adapted to contain lubricant at a certain normal operating level and vertical end wall means closing one end of the housing, an input shaft extending through said vertical end wall means having a gear thereon disposed within said housing, a main transmission shaft coaxial with said input shaft having one end thereof axially spaced from one end of said input shaft, said main transmission shaft being vertically spaced above the normal operating level of the lubricant in said sump and having an axially extending duct extending therethrough for conveying lubricant, said axially extending duct being in fluid communication with a plurality of relatively movable machine parts above the normal operating level of the lubricant requiring lubrication, an annular lubricant distribution chamber encircling said input shaft and partially defined by said vertical end wall means of said housing, conduit means extending between said annular lubricant distribution chamber and said axially extending duct of said main transmission shaft including an elongated tube having one end fixed to said input shaft and its opposite end connected to one end of said main transmission shaft for relative rotary movement, said conduit means establishing fluid communication between said lubricant distribution chamber and said axially extending duct; means for supplying said lubricant distribution chamber with lubricant under pressure whenever the power transmission is in operation including a second gear in meshing engagement with said gear carried by said input shaft, said second gear being rotatably supported in said housing with the lower portion thereof extending below the normal operating level of the lubricant in said sump, a lubricant-receiving chamber carried by said second gear and rotatable therewith, means for supplying said lubricant-receiving chamber with lubricant when the transmission is in operation, a Pitot-tube having one end secured to said vertical end wall means and its opposite end provided with a tip portion disposed in said lubricant-receiving chamber, said tip portion having an opening facing into the direction of rotation of said second gear, and generally radially extending duct means formed through said vertical end wall means for providing fluid communication between the end of said Pitot-tube fixed to said vertical end wall means and said lubricant distribution chamber.

14. In a power transmission substantially as set forth in claim 13, further including an opening extending through said end wall means for establishing fluid communication between said generally radially extending passageway means and the exterior of said housing, and a magnetic plug detachably connected to said vertical end wall means for closing said opening, a surface portion of said plug being in contact with the lubricant flowing through said generally radially extending passageway means.

15. In a power transmission having a housing provided with a sump in the lower portion thereof adapted to contain lubricant at a certain normal operating level and a plurality of relatively movable machine parts above the normal operating level of the lubricant requiring lubrication; means for supplying said relatively movable machine parts with lubricant under pressure whenever the power transmission is in operation including an annular lubricant-receiving chamber having a substantially U-shaped cross section supported in said housing for rotation whenever the power transmission is in operation, said lubricant-receiving chamber having a lower portion thereof extending below the normal operating level of the lubricant in said sump, a gear rotatably supported in said housing with the lower portion thereof extending below the normal operating level of the lubricant in said sump, said gear being adapted to rotate in unison with said chamber whenever the power transmission is in operation, means rotatable with said chamber for supplying said chamber with lubricant whenever the power transmission is in operation including a plurality of circumferentially spaced scoops projecting axially from one side of said gear, each of said scoops having an inlet opening facing into the direction of rotation of said gear and a plurality of lubricant inlet passages, each of said inlet passages being in communication with said lubricant-receiving chamber and a respective scoop, a tube movable relatively to said lubricant-receiving chamber when the power transmission is in operation, one end of said tube being provided with an opening disposed in said lubricant-receiving chamber, said opening facing into the direction of rotation of said lubricant-receiving chamber and being vertically spaced above the normal operating level of lubricant in the sump and vertically below the plurality of relatively movable machine parts requiring lubrication, and passageway means extending between the end of said tube opposite the end opening into said lubricant-receiving chamber and said plurality of relatively movable machine parts.

References Cited in the file of this patent

UNITED STATES PATENTS

| | | |
|---|---|---|
| 1,766,686 | Redmond | June 24, 1930 |
| 2,053,542 | Vandervoort | Sept. 8, 1936 |
| 2,328,104 | Simpson | Aug. 31, 1943 |
| 2,677,440 | Willis | May 4, 1954 |